United States Patent [19]

Mazur

[11] 4,078,441

[45] Mar. 14, 1978

[54] ROTATIONAL POSITIONING USING LINEAR ACTUATORS

[75] Inventor: John T. Mazur, Sebastian, Fla.

[73] Assignee: Harris Corporation, Cleveland, Ohio

[21] Appl. No.: 660,114

[22] Filed: Feb. 23, 1976

[51] Int. Cl.[2] .......... F16H 21/44

[52] U.S. Cl. .......... 74/99 R

[58] Field of Search .......... 74/99 R, 25, 99, 496; 250/33; 343/912

[56] References Cited

U.S. PATENT DOCUMENTS

| | | | |
|---|---|---|---|
| 2,219,844 | 10/1940 | Lotter et al. | 250/33 |
| 2,994,877 | 8/1961 | Mott et al. | 343/912 |
| 3,230,717 | 1/1966 | Alden | 60/54.5 |
| 3,302,532 | 2/1967 | Graham | 74/496 |
| 3,365,015 | 1/1968 | Cadiou | 74/496 |

*Primary Examiner*—Benjamin W. Wyche
*Assistant Examiner*—Wesley S. Ratliff, Jr.

[57] ABSTRACT

Apparatus for positioning a rotatable element. A plurality of linear actuators are used to provide rotational positioning thereof to any selected point along an arc extending through greater than 180°. In one embodiment, two pair of linear actuators provide rotation about respective perpendicular axes to thereby accomplish X/Y positioning over an entire hemisphere.

10 Claims, 5 Drawing Figures

ROTATIONAL POSITIONING USING LINEAR ACTUATORS

The present invention relates to the art of rotational positioning, and more particularly to such positioning through use of linear actuators.

A variety of different arts require the use of a steerable mount to provide rotational positioning of a work piece, instrument, or other device. An example of one such art where applications of this nature frequently abound is radio communications; therefore, the specific embodiment of the present invention will be directed to the art of radio communications. It will be understood, however, that the present invention has much broader applications and may be used in any situation in which a fully steerable mount is required.

In these arts, a need exists for a mount which is steerable over a wide range, and is yet easily and inexpensively manufactored. A number of devices have been previously reported which achieve these results at least in part. In each case, however, these previous methods have been disadvantageous either because of excessive cost or inadequacy of steerable range.

It is therefore an object of the present invention to provide a steerable mount which overcomes the aforementioned difficulties of prior art mounting structures.

It is another object of the present invention to accomplish this through use of linear actuators.

DESCRIPTION OF THE PREFERRED EMBODIMENT

Still other objects and advantages of the present invention will become more readily apparent from the following description of the preferred embodiment as taken in conjunction with the accompanying drawings which are a part hereof and wherein.

As used herein, the term "linear actuator" will be understood to apply to any mechanical device for controlling the linear distance between two points. Examples of linear actuators intended to be included within the meaning of this term are hydraulic linear actuators, ball screw actuators, rack and pinion arrangements, etc. Thus, although the disclosure will be made with reference to hydraulic actuators, it will be understood that any other linear actuator within the meaning of the term could be used for the same purpose.

Figure 1:
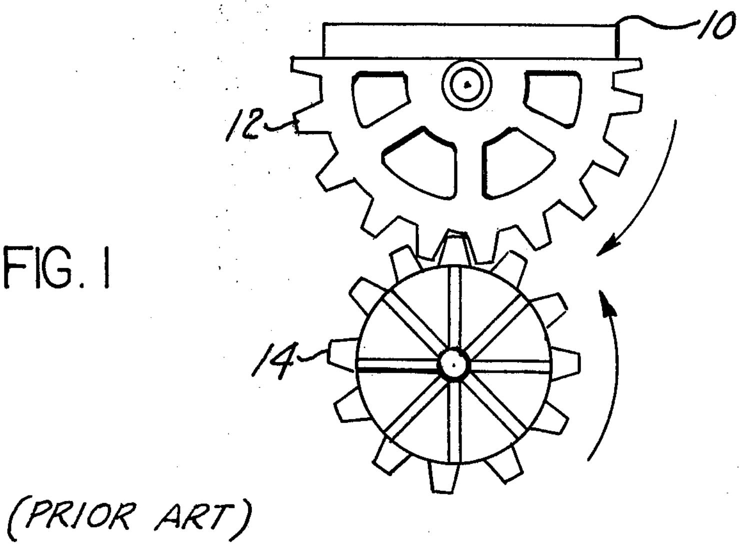
FIG. 1 (PRIOR ART)
FIG. 1 is an illustration of a prior art positioning device using a gearing system.

Before proceeding with a description of the preferred embodiment of the present invention, reference will first be made to FIGS. 1 and 2 to provide a more complete understanding of the background of the invention. Thus, FIG. 1 illustrates a rotatable member 10 drivingly engaged by bull gears 12 to a driving gear 14. By causing rotation of driving gear 14, the rotatable member can be directed into any position along a desired arc. Such amounts, however, tend to be relatively expensive due to the difficulty of manufacturer of the bull gears utilized therein.

Figure 2:
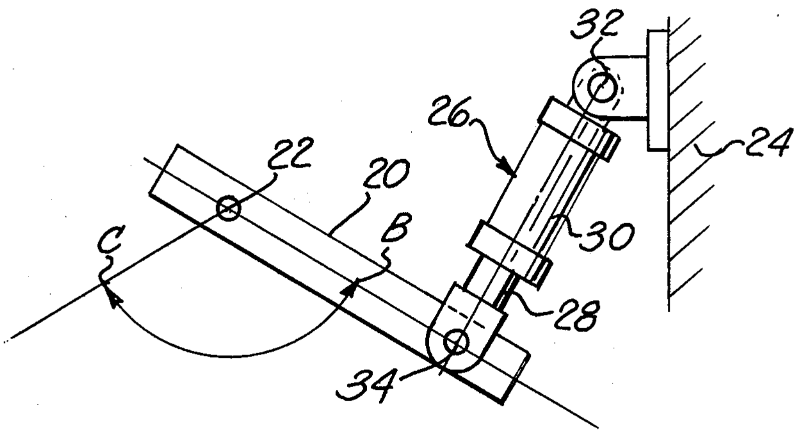
(PRIOR ART) FIG. 2
FIG. 2 is a diagram of a prior art device using a linear actuator.

FIG. 2 illustrates a prior art system using a linear actuator as the driving element. In principle, such systems generally include a member 20 rotatably affixed to an axis 22, which axis is rigid with respect to a frame member 24. The free end of rotatable member 20 is further connected to frame member 24 through a linear actuator 26. The linear actuator 26 shown herein has a piston 28 in the hydraulic cyclinder 30 and is affixed to frame 24 at a rotatable connection 32. The piston 28 is likewise rotatably connected to member 20 about a second axis 34. By controlling the extension of piston 28 from hydraulic cyclinder 30 the distance between the points of connection of linear actuator 26 to rotatable member 20 and frame 24 can thereby be controlled. Since member 20 is rotatably attached to frame 24 about an axis 22, the extension of linear actuator 26 causes rotation of member 20 in accordance with the amount of such extension.

This mounting structure is inappropriate for many uses, however, since the range of rotation of member 20 is severely limited. Beyond points B and C in the rotation of member 20 about axis 22, the majority of the force exerted by linear actuator 26 is radial rather than tangential, thus being abated by the rigid connection of axis 22 with respect to rigid frame number 24. Because of this, the ability to control the motion of a loaded member 20 at the extremities B and C of rotational motion is quite limited. As a practical matter, rotational motion developed by a single linear actuator is limited to rotation through arcs of little greater than 90°.

The present invention overcomes these difficulties through use of a plurality of linear actuators. Thus, as shown in the simplified illustration of FIG. 3, a rotatable member 100 is connected about an axis 102 and additionally to linear actuators 104 and 106 at a common axis 108. For the purposes of illustration, linear actuators 104 and 106 are shown to be hydraulic in nature, similar to linear actuator 26 of FIG. 2. Linear actuator 104 in additionally connected rotatably to a rigid frame 110 at a third axial point 112, and linear actuator 106 is similarly connected to said frame 110 at a separate axial point 114. Thus connected, linear actuators 104 and 106 serve to rotate member 100 through distinct but overlapping arcs. By jointly controlling the actuation of linear actuator 104 and 106, the rotation of member 100 can be controlled over an entire semicircular range. Thus, for example, linear actuator 106 can be used to control the rotation of rotatable member 100 through arc $A_1$, and rotation through the complementary arc $A_2$ can be controlled by linear actuator 104. Handover of rotational control from linear actuator 104 to linear actuator 106 will occur at point D when the device is used in this manner. The handover can conveniently be controlled by a simple rotary switch (not shown) connected to member 100. Efficiency of operation will be enhanced to the extent that the linear actuators are free to extend or contract without resistance when deactivated. Obviously any excess resistance in the motion of the inactive actuator will detract from the driving force of the active actuator.

It will be appreciated by those conversant with this art that any number of modifications may be accomplished without departing from the spirit of the invention defined herein. Thus, for example, both linear actuators could be jointly controlled to each provide a portion of the total rotational force at all stages of the rotation of member 100 about axis 102. When used in this manner, however, it is apparent that the majority of the force at the extremes of rotational range will be provided by either one or the other of the linear actuators. Another possible variation of the present invention would be to divide arc $A_1$ into sub arcs $A_{11}$ and $A_{12}$, and arc $A_2$ into corresponding sub arcs $A_{21}$ and $A_{22}$. Linear actuator 104 could be used to drive member 100 through sub arcs $A_{11}$ and $A_{22}$, while linear actuator 106 could be used to drive member 100 through sub arcs $A_{12}$ and $A_{21}$. Although this complicates switch-over control between the two actuators, it also allows a reduction in the necessary driving range of the linear actuators.

Figure 3:
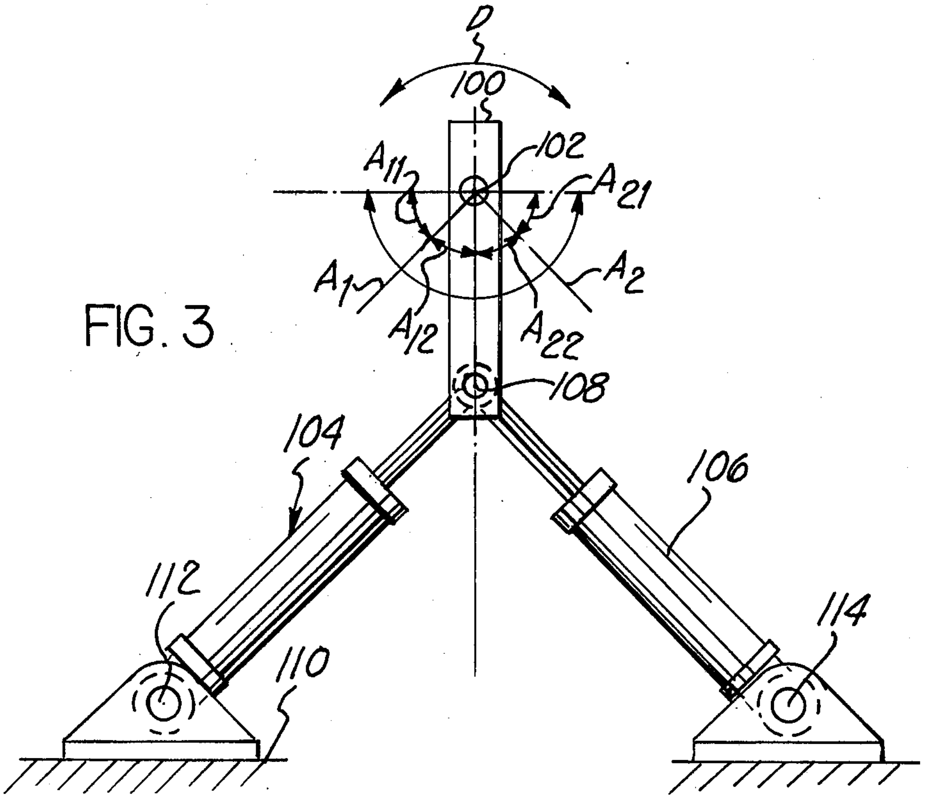
FIG. 3 is a simplified diagram of the present invention.

It will also be appreciated that the linear actuators need not necessarily be connected to a common axial point 108 in the manner shown in FIG. 3. Thus, the only requirements are that linear actuators 104 and 106 be connected between rotatable member 100 and frame 110 so as to each drive rotatable member 100 along respective arcs about axis 102, and that the operative range of the two linear actuators be noncoincident but adjacent for least a portion of the respective arcs.

Figure 4:
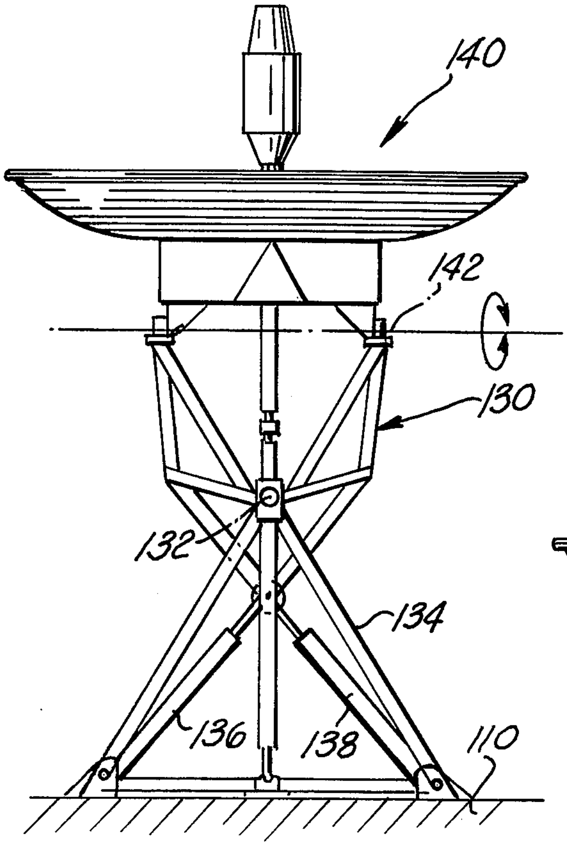
FIGS. 4 and 5 are detailed illustrations of the present invention as used in an X/Y antenna mounting structure.
Figure 5:
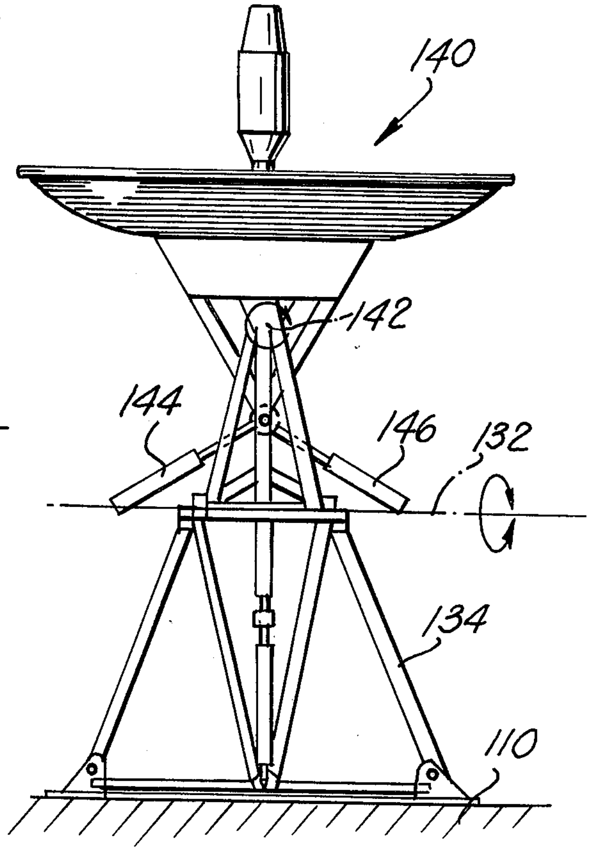

Referring now to FIGS. 4 and 5, description will be made of an application of the invention to an X/Y antenna mount providing greater than 180° of axis travel. FIGS. 4 and 5, respectively, are front and side profiles of the antenna mount. A rotatable element 130 is mounted on an axis 132 which is rigidly fixed with respect to a frame 134. Two linear actuators 136 and 138 are connected between rotatable member 130 and frame 134 to provide greater than 180° of axis travel for member 130 about axis 132. The antenna dish 140 is mounted on a second axis 142 on rotatable member 130, which thus serves as an antenna cradle. Rotation of the antenna 140 about axis 142 is controlled by a second set of linear actuators 144 and 146. Since the two axes 132 and 142 are perpendicular, antenna 140 may be positioned at any point on an entire hemisphere with respect to frame 134. To simplify control of the linear actuators, only one of each set of actuators is active at any given instant, the other actuator being deactivated so as to provide little resistance to the motion of the rotatable member about the respective axis. So constructed, the antenna mount may be used to provide either static positioning, e.g. to direct the antenna to a fixed point on the horizon, or dynamic positioning, e.g. to track a moving object.

Although the invention has been described with respect to preferred embodiments, it will be appreciated that numerous changes may be made without departing from the spirit and scope of the invention as defined in the appended claims.

What is claimed is:

1. Apparatus for controllably positioning a rotatable member, and comprising:

a first frame;

a first member rotatably mounted to said frame on a first axis;

first linear actuator means, connected to both said first frame and said first member, which may be controllably actuated to rotate said first member into any position within at least a first arc and which has a limited ability to controllably rotate said first member into positions within at least a second arc; and, second linear actuator means, connected to both said first frame and said first member, which may be controllably actuated to rotate said first member into any position within at least said second arc and which has a limited ability to controllably rotate said first member into positions within at least said first arc, whereby said first and second linear actuator means may be jointly controlled to thereby act in concert to provide controllable positioning of said first member, within at least said first and second arcs.

2. Apparatus for controllably positioning a rotatable member, and comprising:

a first frame;

a first member rotatably mounted to said first frame on a first axis, said first member serving as a second frame;

first linear actuator means, connected to both said first frame and said first member, which may be controllably actuated to rotate said first member into any position within at least a first arc;

second linear actuator means, connected to both said first frame and said first member, which may be controllably actuated to rotate said first member into any position within at least a second arc noncoincident with but adjacent to said first arc;

a second member rotatably mounted to said second frame on a second axis;

third linear actuator means, connected to both said second frame and said second member, which may be controllably actuated to rotate said second member into any position within at least a third arc; and, fourth linear actuator means, connected to both said second frame and said second member, which may be controllably actuated to rotate said second member into any position within at least a fourth arc noncoincident with but adjacent to said third arc, whereby said first and second linear actuator means may be jointly controlled to thereby act in concert to provide controllable positioning of said first member, within at least said first and second arcs, and whereby said third and fourth linear actuator means may be jointly controlled together with said first and second linear actuators such that said second member may be positioned at any point along at least said first and second arcs with respect to said first axis and at least said third and fourth arcs with respect to said second axis.

3. Apparatus as set forth in claim 2 wherein said third and fourth arcs lie in a plane which is substantially perpendicular to the plane of said first and second arcs.

4. Apparatus as set forth in claim 3 wherein said first and second arcs together extend through an angle of greater than 180°, and said third and fourth arcs similarly extend through an angle of greater than 180° whereby said second member may be positioned at any point within at least a full hemisphere with respect to said first frame.

5. Apparatus as set forth in claim 1 wherein each of said linear actuator means comprise means for controlling the linear distance between two points, said points being the points of connection of said actuator means to said first frame and said first member.

6. Apparatus as set forth in claim 1 wherein said first actuator means is deactivated when said second actuator means is active and wherein said second actuator means is deactivated when said first actuator means is active.

7. Apparatus as set forth in claim 6 wherein said first and second linear actuator means each provide little resistance when deactivated to the motion of said first rotatable member.

8. Apparatus as set forth in claim 1 wherein said first and second arcs extend through equal angles each greater than 90°.

9. Apparatus for providing a steerable mount for an antenna and comprising:

a first frame;

antenna means rotatably mounted to said frame on a first axis;

first linear actuator means, connected to both said first frame and said antenna means, which may be controllably actuated to rotate said antenna means into any position within at least a first arc and which has a limited ability to controllably rotate said antenna means into positions within at least a second arc; and, second linear actuator means, connected to both said first frame and said antenna means, which may be controllably actuated to rotate said antenna means into any position within at least said second arc and which has a limited ability to controllably rotate said antenna means into positions within at least said first arc, whereby said first and second linear actuator means may be jointly controlled to thereby act in concert to provide controllable positioning of said antenna means, within at least said first and second arcs.

10. Apparatus for providing a fully steerable mount for an antenna and comprising:

a frame;

a member rotatably mounted to said frame on a first axis;

first linear actuator means, connected to both said frame and said member, which may be controllably actuated to rotate said member into any position within at least a first arc;

second linear actuator means, connected to both said frame and said member which may be controllably actuated to rotate said member into any position within at least a second arc noncoincident with but adjacent to said first arc, whereby said first and second linear actuator means may be jointly controlled to thereby act in concert to provide controllable positioning of said member, within at least said first and second arcs;

antenna means rotatably mounted to said member on a second axis;

third linear actuator means, connected to both said member and said antenna means, which may be controllably actuated to rotate said antenna means into any position within at least a third arc;

fourth linear actuator means, connected to both said member and said antenna means, which may be controllably actuated to rotate said antenna means into any position within at least a fourth arc noncoincident with but adjacent to said third arc, whereby said third and fourth linear actuator means may be jointly controlled together with said first and second linear actuators such that said antenna means may be positioned at any point along at least said first and second arcs with respect to said first axis and at least said third and fourth arcs with respect to said second axis.

* * * * *